United States Patent
DiFoggio

(10) Patent No.: US 9,637,996 B2
(45) Date of Patent: May 2, 2017

(54) DOWNHOLE USES OF NANOSPRING FILLED ELASTOMERS

(71) Applicant: Rocco DiFoggio, Houston, TX (US)

(72) Inventor: Rocco DiFoggio, Houston, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 483 days.

(21) Appl. No.: 14/218,008

(22) Filed: Mar. 18, 2014

(65) Prior Publication Data
US 2015/0267496 A1  Sep. 24, 2015

(51) Int. Cl.
E21B 33/12 (2006.01)
E21B 47/12 (2012.01)
E21B 33/13 (2006.01)
B82Y 30/00 (2011.01)

(52) U.S. Cl.
CPC .......... *E21B 33/1208* (2013.01); *E21B 33/13* (2013.01); *E21B 47/12* (2013.01); *E21B 47/122* (2013.01); *B82Y 30/00* (2013.01)

(58) Field of Classification Search
CPC .... E21B 33/1208; E21B 47/122; E21B 33/13; E21B 47/12; E21B 33/12; C09K 8/50; B82Y 30/00
See application file for complete search history.

(56) References Cited

U.S. PATENT DOCUMENTS

| 5,073,321 | A | 12/1991 | Wheeler |
| 6,986,877 | B2 | 1/2006 | Takikawa et al. |
| 7,604,049 | B2 * | 10/2009 | Vaidya ............... E21B 33/1208 166/105 |
| 7,696,275 | B2 * | 4/2010 | Slay ....................... B82Y 30/00 524/445 |
| 8,020,621 | B2 | 9/2011 | DiFoggio et al. |
| 8,096,353 | B2 | 1/2012 | Ver Meer |
| 8,267,185 | B2 | 9/2012 | Ocampos et al. |
| 2005/0109502 | A1 * | 5/2005 | Buc Slay ............... B82Y 30/00 166/179 |
| 2006/0186601 | A1 | 8/2006 | Lopez et al. |

(Continued)

FOREIGN PATENT DOCUMENTS

WO   2013107789 A1   7/2013

OTHER PUBLICATIONS

Heinrich, G., et al., "Reinforcement of elastomers", Current Opinion in Solid State and Materials Science 6, (2002) pp. 195-203.

(Continued)

*Primary Examiner* — Michael Wills, III
(74) *Attorney, Agent, or Firm* — Cantor Colburn LLP

(57) ABSTRACT

A seal includes an elastomeric material and a plurality of nanosprings filling the elastomeric material to form a filled elastomeric composite that provides the seal. A spring constant of the nanosprings is within a selected range of an effective spring constant of the elastomeric material such that a durometer of the filled elastomeric composite at an elevated temperature is greater than the durometer of the elastomeric material alone at the elevated temperature. The seal may be used to seal a first component to a second component where both components are configured to perform a task below the surface of the earth.

26 Claims, 3 Drawing Sheets

Filled Elastomeric Composite

(56) References Cited

U.S. PATENT DOCUMENTS

| | | | |
|---|---|---|---|
| 2008/0224413 A1* | 9/2008 | Doane | E21B 33/1208 |
| | | | 277/323 |
| 2009/0038858 A1 | 2/2009 | Griffo et al. | |
| 2009/0253852 A1* | 10/2009 | Noguchi | C09K 3/1009 |
| | | | 524/496 |
| 2010/0181729 A1 | 7/2010 | Slay et al. | |
| 2011/0139466 A1 | 6/2011 | Chen et al. | |
| 2011/0156357 A1 | 6/2011 | Noguchi et al. | |
| 2012/0035309 A1 | 2/2012 | Zhu et al. | |
| 2012/0312102 A1 | 12/2012 | Alvarez et al. | |
| 2012/0312560 A1 | 12/2012 | Bahr et al. | |
| 2012/0312602 A1* | 12/2012 | Zhang | E21B 10/25 |
| | | | 175/371 |
| 2014/0060815 A1 | 3/2014 | Wang et al. | |
| 2014/0097574 A1* | 4/2014 | Saito | C09K 3/10 |
| | | | 277/500 |

OTHER PUBLICATIONS

Liu, et al., "The Interesting Influence of Nanosprings on the Viscoelasticity of Elastomeric Polymer Materials: Simulation and Experiment", Adv. Funct. Mater. 2013, 23, pp. 1156-1163, wileyonlinelibrary.com. DOI: 10.1002/adfm.201201438.
Notification of Transmittal of the International Search Report and the Written Opinion of the International Searching Authority, or the Decleration;PCT/US2015/021161; Mail date Jun. 23, 2015, 13 pages.
Zhang, et al., "Synthesis, Characterization, and Manipulation of Helical SiO2 Nanosprings", Nano Letters, 2003, vol. 3, No. 5, pp. 577-580.

\* cited by examiner

DOWNHOLE USES OF NANOSPRING FILLED ELASTOMERS

BACKGROUND

Downhole tools generally refer to tools, apparatus, or components that are disposed or conveyed through a borehole penetrating the earth. These tools are generally used for geophysical exploration or production such as for hydrocarbons or geothermal energy or for carbon dioxide sequestration. Typically, the downhole tools have components that are required to be sealed together usually to either keep fluids in the component assembly from escaping or to keep harmful borehole fluids out.

Seals such as O-rings and gaskets for example may be used to seal such components together. Many of these seals are typically made of an elastomer having some elasticity. The elasticity allows the seal to be compressed yet provide some extrusion resistance that keeps the seal firmly planted against the sealing surfaces in order to provide sealing capability that may even accommodate some vibration. Unfortunately, temperatures downhole can be extremely high sometimes reaching 200° C. or even greater. These high temperatures can lead to the seals becoming soft and losing their ability to seal especially when subject to high vibrations in a while-drilling tool. To compensate for eventual temperature softening, extra hard O-rings or gaskets are sometimes used that may be too hard to sufficiently compress for a good seal at room temperature. Thus, there is a need for an elastomer with more gradual temperature softening than typical filled or unfilled elastomers.

BRIEF SUMMARY

Disclosed is a seal made of a material that includes an elastomeric material and a plurality of nanosprings filling the elastomeric material to form a filled elastomeric composite that provides the seal. A spring constant of the nanosprings is within a selected range of an effective spring constant of the elastomeric material such that a durometer of the filled elastomeric composite at an elevated temperature is greater than the durometer of the elastomeric material alone at the elevated temperature.

Also disclosed is an apparatus configured for being disposed below a surface of the earth. The apparatus includes: a first component configured for being disposed below a surface of the earth; a second component configured for being disposed below the surface of the earth; and a seal configured to contact the first component and the second component to provide a seal between the first component and the second component. The seal includes an elastomeric material and a plurality of nanosprings filling the elastomeric material to form a filled elastomeric composite that provides the seal, wherein a spring constant of the nanosprings is within a selected range of an effective spring constant of the elastomeric material such that a durometer of the filled elastomeric composite at an elevated temperature is greater than the durometer of the elastomeric material alone at the elevated temperature.

Further disclosed is a method for performing a task below a surface of the earth. The method includes: sealing a first component to a second component using a seal where the first component and the second component are configured to perform the task; and disposing the first component and the second component below the surface of the earth. The seal includes an elastomeric material and a plurality of nanosprings filling the elastomeric material to form a filled elastomeric composite that provides the seal, wherein a spring constant of the nanosprings is within a selected range of an effective spring constant of the elastomeric material such that a durometer of the filled elastomeric composite at an elevated temperature is greater than the durometer of the elastomeric material alone at the elevated temperature.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method presented herein by way of exemplification and not limitation with reference to the figures.

Disclosed are embodiments of apparatus configured for use below the surface of the earth that include one or more seals that seal two or more components together. In order to maintain their sealing capability at subsurface temperatures that may exceed 200° C., the seals are made of an elastomeric material that is embedded with a plurality of nanosprings. The nanosprings are made of a material (glass, metal, ceramic, and others) whose elastic moduli change much more slowly with temperature than do the elastic moduli of typical elastomers even when the nanosprings are exposed to high subsurface temperatures. The coils of the nanospring make its effective Young's modulus a much closer match to the Young's modulus of an elastomer than would be the effective Young's modulus of a straight fiber that was made out of the same material. Thus, stress at the surface adhesion layer between the filler (i.e., nanosprings) and the elastomer is reduced and the likelihood of breaking that adhesion and irreversibly changing the durometer of the elastomer composite is also reduced. Note that the degree to which load can be transferred from the matrix to the filler depends upon that interfacial bond. Even though the elastomeric material itself may be come soft, the elastomeric composite (i.e., mixture of elastomeric material and nanosprings) will maintain the required durometer rating due to the nanosprings. That is, the durometer rating of the seal made of the elastomeric composite will change less over a wide temperature range than would a seal made of just the elastomeric material alone.

Figure 1:
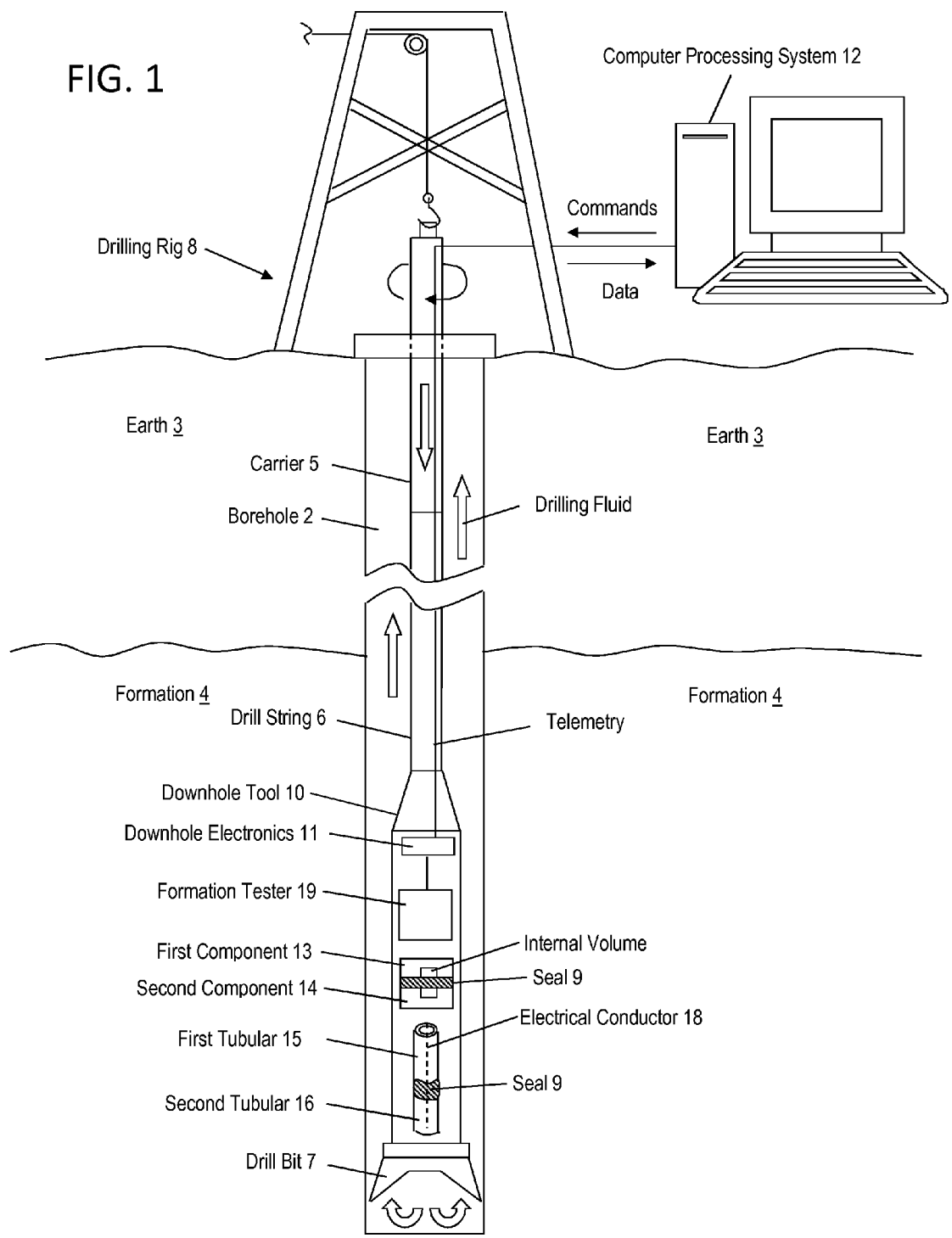
FIG. 1 illustrates a cross-sectional view of an exemplary embodiment of a downhole tool disposed in a borehole penetrating the earth.

FIG. 1 illustrates a cross-sectional view of an exemplary embodiment of a downhole tool 10 disposed in a borehole 2 penetrating the earth 3, which may include an earth formation 4. The formation 4 represents any subsurface material of interest that may be sensed or acted upon by the tool 10. The downhole tool 10 is conveyed through the borehole 2 by a carrier 5, which can be a drill tubular such as a drill string 6. A drill bit 7 is disposed at the distal end of the drill string 6. A drill rig 8 is configured to conduct drilling operations such as rotating the drill string 6 and thus the drill bit 7 in order to drill the borehole 2. In addition, the drill rig 8 is configured to pump drilling fluid through the drill string 6 in order to lubricate the drill bit 7 and flush cuttings from the borehole 2. Downhole electronics 11 are configured to operate the downhole tool 10, process measurement data obtained downhole, and/or act as an interface with telemetry to communicate data or commands between downhole components and a computer processing system 12 disposed at the surface of the earth 3. Non-limiting embodiments of the telemetry include pulsed-mud and wired drill pipe. System operation and data processing operations may be performed by the downhole electronics 11, the computer processing system 12, or a combination thereof. The downhole tool 10 may be operated continuously or at discrete selected depths in the borehole 2. In an alternative embodiment, the carrier 5 may be an armored wireline, which can also provide communications with the processing system 12. In one or more embodiments, the downhole tool 10 includes a formation tester 19 configured to extract a sample of a formation fluid through a wall of the borehole 2. The sample may be analyzed downhole or contained in a sample chamber for analysis outside of the borehole.

The downhole tool 10 in the embodiment of FIG. 1 includes a first component 13 that is sealed to a second component 14 by a seal 9. In one or more no-limiting embodiments, the seal 9 is an O-ring seal or a gasket. The components 13 and 14 represent any components or structures requiring a seal in order to be sealed to one another. In one or more embodiments, the components or structures sealed together define an internal volume or cavity such that the seal 9 is configured to keep internal fluids from leaking out of the volume and/or to prevent external fluids from leaking into the volume. For example, the seal 9 may be used to seal a first tubular 15 to a second tubular 16. Non-limiting embodiments of the tubulars include pipes, tubing, conduits, and tubular connectors such as threaded connectors having O-ring seals. The tubulars may be used to contain or flow a fluid or they may house an electrical conductor 18 for conducting electricity.

Figure 2:
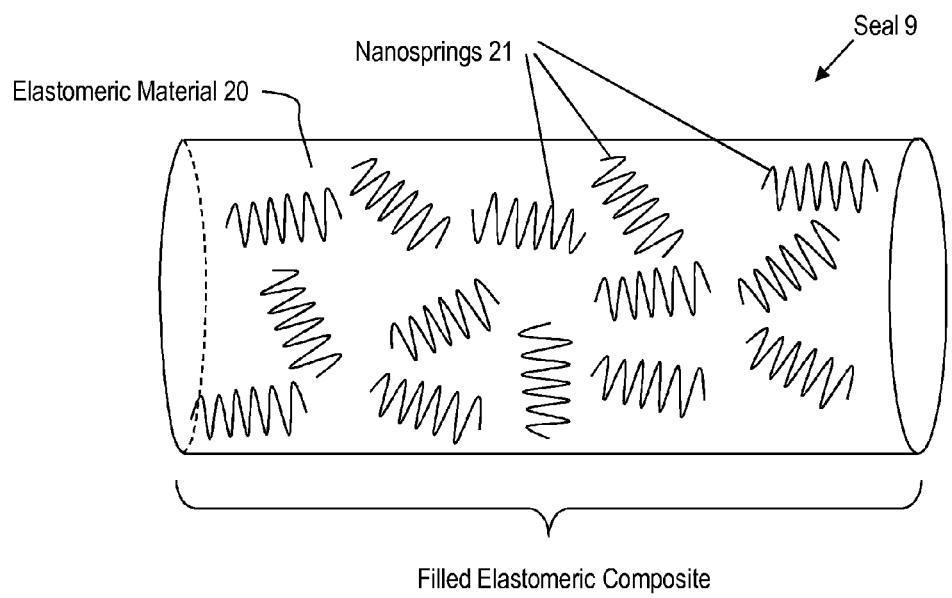
FIG. 2 depicts aspects of a seal in the downhole tool made of a seal made of an elastomer filled with nanosprings in a cross-sectional view.

Refer now to FIG. 2, which depicts aspects of the seal 9. The seal 9 includes an elastomeric material 20 that is filled with a plurality of nanosprings 21. The elastomeric material 20 has a durometer value that allows the elastomeric material to push back on surfaces that are compressing the elastomeric material in order to provide sealing capability such as by filling in small voids in the surfaces. Elastomeric materials suitable for being configured as seals are known to one of ordinary skill in the art and include polymers, rubber (natural and synthetic), elastomers, and compounds of various ingredients including one or more base polymers or elastomers. Some chemical names used to describe elastomeric materials suitable for seals include Acrylonitrile-Butadiene (nitrile rubber), Carboxylated Nitrile, Ethylene Acrylate, Ethylene Propylene Rubber, Butyl Rubber, Butadiene Rubber, Chlorobutyl Rubber, Chloroprene Rubber, Chlorosulfonated Polyethylene, Epichlorohydrin, Fluorocarbon, Fluorosilicon, hydrogenated Nitrile, Perfluoroelastomer, Polyacrylate, Polyulethane, Silicone Rubber, Styrene-Butadiene, and Tetrafluoroethylene-Propylene, among others.

In general, the nanosprings 21 are substantially (e.g., greater than 90% of the nanosprings) evenly distributed and randomly oriented in the elastomeric material 20. The nanosprings 21 are constructed of a material that is much less affected by temperature and especially high temperatures compared to the elastomeric material 20. Non-limiting embodiments of nanospring material include a glass material, carbon, silicon, silicon carbide, silicon dioxide, zinc oxide, and palladium. Suitable glass materials include silica or silicon dioxide. Nanosprings made of silica are available from STREM CHEMICALS, INC. of Newburyport, Mass. Nanosprings have dimensions on the order of nanometers (nm). For example, coil nanosprings may have a coil diameter of 80 to 140 nm may be about 50 microns long in one or more embodiments.

Figure 3:
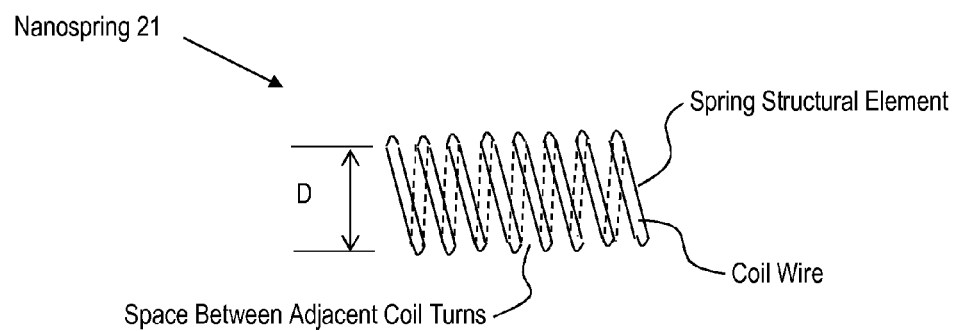
FIG. 3 depicts aspects of a nanospring.

Each of the nanosprings 21 has a structural configuration of a spring. The spring may have a shape associated with a spring constant and provide sufficient surface area for adhering to the elastomeric material 20. In one or more embodiments, each of the nanosprings is configured as a coil spring such as illustrated in FIG. 3. Mathematical equations to model a coil spring are known in the art and can be used to determine the spring constant of a coiled spring of known dimensions and known modulus of rigidity of the spring material. From the spring constant can be calculated an effective Young's modulus, Y, that corresponds to a uniform material in the shape of a solid rod having the same length, L, and diameter, D, as the spring. Specifically, the effective Y of the spring equals the spring constant, K, multiplied by the length (L) and divided by the cross-sectional area ($\pi D^2/4$) For example, the spring constant K (pounds of load per inch of deflection) of a coil spring is calculated using the following equation:

$$K=Gd^4/8nD^3$$

where G is the modulus of rigidity of the spring material in pounds per square inch, d is the wire diameter of the wire making up the coil in inches, D is the mean diameter of the coil (from center of coil wire to center of coil wire), and n is the number of coils subjected to flexure and is generally less than the total number of coils. In the embodiment of FIG. 3, each of the turns of the coil wire is separated from an adjacent turn. This separation provides a space between the turns for the elastomeric material to fill and adhere to the coils to provide an increase in surface area for increased adhesion. In other embodiments, adjacent turns of the coil wire may touch each other in a relaxed state with an inner coil surface and an outer coil surface providing sufficient surface area for the elastomeric material to adhere to.

Well known theoretical models for heterogeneous mixtures of two materials are the Voigt model (1889, parallel springs, considered as an upper bound) and the Reuss model (1929, series springs, considered as a lower bound). In the series model, a composite can be modeled as two springs in series with the elastomeric material having one spring constant and the filler having another spring constant and assuming minimum filler-filler interaction. The composite spring constant of the seal matrix material approaches the spring constant of the softer spring whenever the softer spring's constant becomes much less than that of a stiffer spring. In one example, as the temperature of an elastomeric material that is filled with much stiffer carbon or glass particles (rigid uncompressible filler particles) increases, this composite becomes even softer because the rigid embedded particles become increasingly mismatched in stiffness (and therefore increasingly irrelevant) to the overall stiffness of this composite unless the concentration of the rigid filler particles is high enough to network or contact with one another. That is, in the series model, the composite filled with the rigid particles eventually approaches the stiffness of the elastomeric material alone because such rigid particles are much stiffer than the elastomeric material in which they are embedded. However, filling the elastomeric material with relatively soft springs such as nanosprings that are made from a stiff base material that is relatively unaffected by the high subsurface temperatures (and thus having a spring constant, K, that is relatively unaffected by the high subsurface temperatures) allows the elastomeric material matrix to retain the minimal temperature dependence of the nanosprings while still making a filler that is not excessively stiffer than the elastomeric material alone. Accordingly, the effective stiffness (i.e., spring constant K) of the nanosprings can be adjusted such as by adjusting the "wire" diameter and the coil diameter so that the effective stiffness is a much closer match to elastomeric material. In one or more embodiments, the spring constant of each of the nanosprings is within a selected range of an effective spring constant of the elastomeric material when the elastomeric material is at room temperature, thus insuring that the seal will maintain an acceptable durometer rating at an increased temperature.

In one example, the spring constant K was calculated and found to be 0.10 N/m for a silica glass nanospring having a shear modulus G of $3.12E+10$ N/m$^3$, a wire diameter of $8.70E-08$ meters, 317 coils (n) for a nanospring 0.1 mm long, and a coil diameter $1.92E-07$ meters. An elastomer having a cylindrical shape defined by the outer dimensions of this nanospring and having a Young's modulus (Y) of $2.08E+07$ N/m$^3$ and 90 durometer hardness rating has as effective spring constant ($K_{eff}$) of $6.03E-03$ ($K_{eff}=Y \cdot A/L$ where A is the cross-sectional area and L is the length of the cylinder). Hence, the glass nanospring is only about 16 times stiffer than this 90 durometer elastomer.

In a second example, an elastomer having a Young's modulus (Y) of $9.35E+06$ N/m$^3$ and 80 durometer hardness rating has an effective spring constant $K_{eff}$ of $2.71E-03$ for the above defined cylinder dimensions. Hence, the glass nanospring is only about 37 times stiffer than this 80 durometer elastomer.

In a third example, an elastomer having a Young's modulus (Y) of $5.52E+06$ N/m$^3$ and 70 durometer hardness rating has an effective spring constant $K_{eff}$ of $1.60E-03$ for the above defined cylinder dimensions. Hence, the glass nanospring is only about 62 times stiffer than this 70 durometer elastomer.

From the above examples, it can be seen that varying one or more parameters of the nanospring can provide a spring constant (K) that is a closer match to the effective stiffness ($K_{eff}$) of the elastomeric material. For the various durometer ratings of the elastomer examples, the spring constant of each of the nanosprings can be less than 100 times, less than 50 times, or less than 20 times stiffer than the effective spring constant of the elastomeric material. Even closer matches may be obtained with appropriate nanospring dimensions and material properties.

For comparison purposes, a straight silica glass fiber having a Young's modulus of $7.30E+10$ N/m$^2$ and of equivalent size to the above analyzed nanospring has a spring constant (K) of $2.11E+01$ N/m, which is about 3502 times stiffer than the 90 durometer elastomer, 7806 times stiffer than the 80 durometer elastomer, and 13,223 times stiffer than the 70 durometer elastomer. Further, this straight silica glass fiber is 213 times stiffer than the above exemplary silica nanospring. Hence, glass nanosprings are able to provide a much better stiffness match to the elastomeric material than straight glass fibers.

Figure 4:
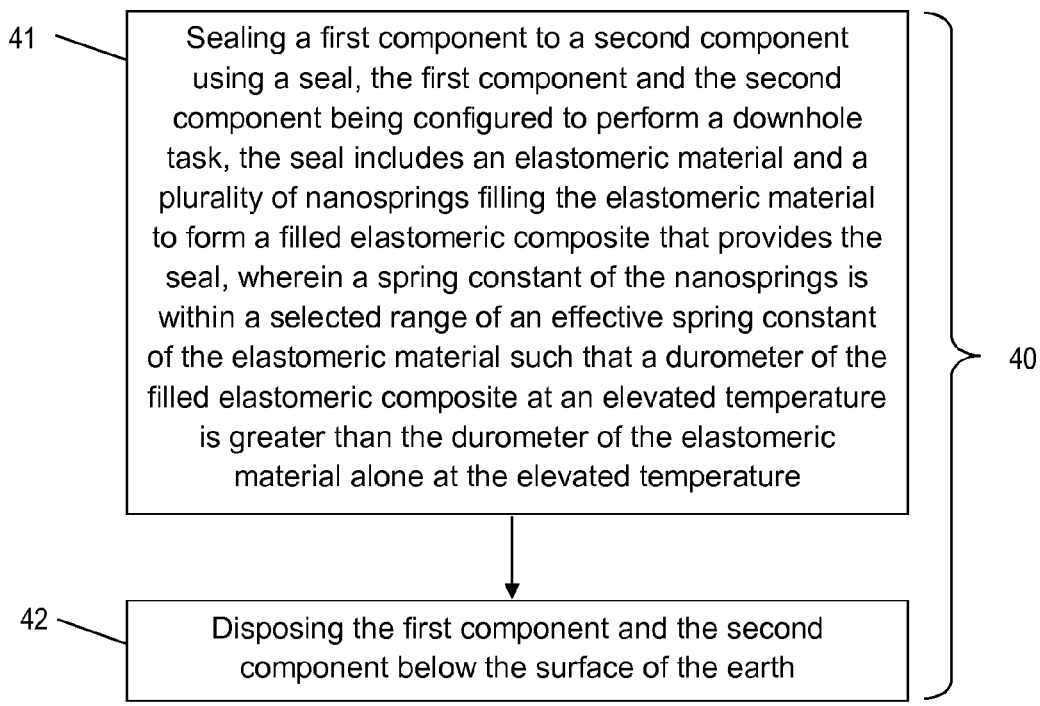
FIG. 4 is flow chart for a method for performing a function with a tool downhole.

FIG. 4 is a flow chart for a method 40 for performing a task below a surface of the earth. Block 41 calls for sealing a first component to a second component using a seal. The first component and the second component are configured to perform the task. The seal includes an elastomeric material and a plurality of nanosprings filling the elastomeric material to form a filled elastomeric composite that provides the seal. A spring constant of the nanosprings is within a selected range of an effective spring constant of the elastomeric material such that a durometer (i.e., durometer value) of the filled elastomeric composite at an elevated temperature is greater than the durometer of the elastomeric material alone at the elevated temperature. In one or more embodiments, the spring constant of each of the nanosprings is within the selected range of an effective spring constant of the elastomeric material when the elastomeric material is at room temperature (e.g., 70° F.). In one or more embodiments, the durometer of the filled elastomeric composite changes less with temperature than it would for a filler that was not in the shape of a spring. Block 42 calls for disposing the first component and the second component below the surface of the earth. The method 40 may also include conveying a carrier through a borehole penetrating an earth formation, wherein the first component and the second component are disposed on the carrier. The first component and the second component may be part of a downhole tool that is a formation tester configured to extract a sample of a formation fluid through a wall of the borehole. The method 40 may also include flowing a fluid through the first component and the second component or containing the fluid within the first component and the second component. The method 40 may also include conducting electricity through a conductor disposed in the first component and the second component.

The above disclosed seal made of the elastomeric material filled with nanosprings provides several advantages. One advantage is that the use of nanosprings such as those made of silica glass reduces creep. From the coil spring equations, it is seen that the spring constant depends upon the shear modulus of the "wire" from which the coil is made. For a nanospring coil that is made of silica glass, the shear modulus, G, changes much more slowly with temperature than does a polymer's shear modulus change with temperature. Polymers undergo "creep". That is, for a constant applied force, they flow slightly over time like a very viscous liquid. For glass, creep is negligible. Consequently, the filled elastomeric composite maintains its sealing force and capability over time. Another advantage is that the filled elastomeric composite has a durometer with reduced temperature dependence so the seal does not get unsatisfactorily soft at elevated temperatures.

Yet another advantage is a glass nanospring is about 200 times more stretchable than a straight glass fiber so using nanosprings instead of straight glass fiber reduces debonding of elastomer to filler that is caused by mechanical stretching or by a mismatch of coefficient of thermal expansion and cycling over too large a temperature range. Note that, once debonded, the mechanical properties of the elastomer-filler composite are irreversibly degraded. A straight glass fiber has about 200-300 times less thermal expansion than an elastomer but a glass coil spring is about 200 times more stretchable so it can stretch along with the elastomer's much larger thermal expansion to maintain bonding. Similar advantages apply to nanosprings made of other materials, such as carbon, silicon, silicon carbide, zinc oxide, palladium, and others having similar characteristics.

In support of the teachings herein, various analysis components may be used, including a digital and/or an analog system. For example, the downhole electronics 11, the computer processing system 12, or the downhole tool 10 may include digital and/or analog systems, which are sealed using the seal 9. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components using the seal 9 may be included and called upon for providing for aspects of the teachings herein. For example, a power supply (e.g., at least one of a generator, a remote supply and a battery), cooling component, heating component, magnet, electromagnet, sensor, electrode, transmitter, receiver, transceiver, antenna, controller, optical unit, electrical unit or electromechanical unit may be included in support of the various aspects discussed herein or in support of other functions beyond this disclosure.

The term "carrier" as used herein means any device, device component, combination of devices, media and/or member that may be used to convey, house, support or otherwise facilitate the use of another device, device component, combination of devices, media and/or member. Other exemplary non-limiting carriers include drill strings of the coiled tube type, of the jointed pipe type and any combination or portion thereof. Other carrier examples include casing pipes, wirelines, wireline sondes, slickline sondes, drop shots, bottom-hole-assemblies, drill string inserts, modules, internal housings and substrate portions thereof.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms. The terms "first," "second" and the like do not denote a particular order, but are used to distinguish different elements. The term "configured" relates to a structural limitation of an apparatus that allows the apparatus to perform the task or function for which the apparatus is configured. One of ordinary skill in the art upon reading the teachings of the present disclosure would understand the required structural limitation.

The flow diagram depicted herein is just an example. There may be many variations to this diagram or the steps (or operations) described therein without departing from the spirit of the invention. For instance, the steps may be performed in a differing order, or steps may be added, deleted or modified. All of these variations are considered a part of the claimed invention.

While one or more embodiments have been shown and described, modifications and substitutions may be made thereto without departing from the spirit and scope of the invention. Accordingly, it is to be understood that the present invention has been described by way of illustrations and not limitation.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A seal comprising:
  an elastomeric material; and
  a plurality of nanosprings filling the elastomeric material to form a filled elastomeric composite that provides the seal;
  wherein a spring constant of the nanosprings is within a selected range of an effective spring constant of the elastomeric material such that a durometer of the filled elastomeric composite at an elevated temperature is greater than the durometer of the elastomeric material alone at the elevated temperature.

2. The seal according to claim 1, wherein the durometer of the filled elastomeric composite changes less with temperature than it would for a filler that was not in the shape of a spring.

3. The seal according to claim 1, wherein the selected range is less than 100 times stiffer than the effective spring constant of the elastomeric material.

4. The seal according to claim 3, wherein the selected range is less than 50 times stiffer than the effective spring constant of the elastomeric material.

5. The seal according to claim 4, wherein the selected range is less than 20 times stiffer than the effective spring constant of the elastomeric material.

6. The seal according to claim 1, wherein the spring constant of each of the nanosprings is within the selected range of an effective spring constant of the elastomeric material when the elastomeric material is at room temperature.

7. The seal according to claim 1, wherein the elastomeric material comprises at least one of acrylonitrile-butadiene, carboxylated nitrile, ethylene acrylate, ethylene propylene rubber, butyl rubber, butadiene rubber, chlorobutyl rubber, chloroprene rubber, chlorosulfonated polyethylene, epichlorohydrin, fluorocarbon, fluorosilicon, hydrogenated nitrile, perfluoroelastomer, polyacrylate, polyulethane, silicone rubber, styrene-butadiene, and tetrafluoroethylene-propylene.

8. The seal according to claim 1, wherein the plurality of nanosprings comprise at least one of a glass material, carbon, silicon, silicon carbide, silicon dioxide, zinc oxide, and palladium.

9. The seal according to claim 1, wherein the plurality of nanosprings are substantially evenly distributed and randomly oriented throughout the elastomeric material.

10. The seal according to claim 1, wherein a structural element of each of the nanosprings in the plurality is in contact with the elastomeric material.

11. The seal according to claim 10, wherein the structural element adheres to the elastomeric material.

12. The seal according to claim 1, wherein each of the nanosprings in the plurality is configured as a coil spring comprising one or more turns of a coiled element.

13. The seal according to claim 1, wherein the coil spring comprises a plurality of turns of the coiled elements and the turns are configured to provide a space between adjacent turns such that the elastomeric material fills the space.

14. An apparatus configured for being disposed below a surface of the earth, the apparatus comprising:
    a first component configured for being disposed below a surface of the earth;
    a second component configured for being disposed below the surface of the earth; and
    a seal configured to contact the first component and the second component to provide a seal between the first component and the second component, the seal comprising an elastomeric material and a plurality of nanosprings filling the elastomeric material to form a filled elastomeric composite that provides the seal;
    wherein a spring constant of the nanosprings is within a selected range of an effective spring constant of the elastomeric material such that a durometer of the filled elastomeric composite at an elevated temperature is greater than the durometer of the elastomeric material alone at the elevated temperature.

15. The apparatus according to claim 14, wherein at least one of the first component and the second component is a tubular.

16. The apparatus according to claim 15, wherein at least one of the first component and the second component is a connector.

17. The apparatus according to claim 14, wherein the first component comprises an internal volume that is sealed to the second component by the seal.

18. The apparatus according to claim 14, wherein the apparatus is disposed in a borehole penetrating an earth formation.

19. The apparatus according to claim 18, further comprising a carrier configured to be conveyed through the borehole, wherein the first component and the second component are disposed on the carrier.

20. The apparatus according to claim 14, wherein the first component and the second component are part of a formation fluid tester configured to extract a sample of a formation fluid through a wall of the borehole.

21. A method for performing a task below a surface of the earth, the method comprising:
    sealing a first component to a second component using a seal, the first component and the second component being configured to perform the task, the seal comprising an elastomeric material and a plurality of nanosprings filling the elastomeric material to form a filled elastomeric composite that provides the seal; and
    disposing the first component and the second component below the surface of the earth;
    wherein a spring constant of the nanosprings is within a selected range of an effective spring constant of the elastomeric material such that a durometer of the filled elastomeric composite at an elevated temperature is greater than the durometer of the elastomeric material alone at the elevated temperature.

22. The method according to claim 21, wherein the durometer of the filled elastomeric composite changes less with temperature than it would for a filler that was not in the shape of a spring.

23. The method according to claim 21, further comprising conveying a carrier through a borehole penetrating an earth formation, wherein the first component and the second component are disposed on the carrier.

24. The method according to claim 23, wherein the first component and the second component are part of a downhole tool that is a formation tester configured to extract a sample of a formation fluid through a wall of the borehole.

25. The method according to claim 21, further comprising flowing a fluid through the first component and the second component or containing the fluid within the first component and the second component.

26. The method according to claim 21, further comprising conducting electricity through a conductor disposed in the first component and the second component.

* * * * *